United States Patent [19]

Johns

[11] Patent Number: 4,768,800

[45] Date of Patent: Sep. 6, 1988

[54] BICYCLE STAND DEVICE

[76] Inventor: Stephen G. Johns, 822 Cardinal Rd., Cocoa, Fla. 32926

[21] Appl. No.: 100,734

[22] Filed: Sep. 24, 1987

[51] Int. Cl.⁴ .............................................. B62H 1/02
[52] U.S. Cl. ..................................... 280/293; 24/457; 248/357; 280/303
[58] Field of Search ............... 280/293, 295, 296, 297, 280/298, 300, 301, 303, 304; 248/357, 351; 24/457, 639, 629; D34/31

[56] References Cited

U.S. PATENT DOCUMENTS

| 523,952 | 7/1894 | Woodward | 280/301 |
| 3,712,640 | 1/1973 | Shipman | 280/301 |
| 3,955,829 | 5/1976 | Bussler | 280/293 |
| 3,970,330 | 7/1976 | Norcross | 280/301 |
| 3,998,470 | 12/1976 | Houston | 280/301 |
| 4,474,387 | 10/1984 | Maranell | 280/293 |
| 4,521,031 | 6/1985 | Huth | 280/293 |

Primary Examiner—John J. Love
Assistant Examiner—Everett G. Diederiks, Jr.
Attorney, Agent, or Firm—Macdonald J. Wiggins

[57] ABSTRACT

An auxiliary pad for attachment to the foot portion of a bicycle kickstand is molded in two pieces of polypropylene. A clamp section has a pair of opposing semicylindrical clamp elements and can be folded to clamp around the downwardly extending rod of the kickstand. A pair of semicylindrical shims is attached to the clamp elements and can be used if required. A pad section is provided having a ribbed underside and a pair of brackets to accept a pair of clamp legs serving to hold the pad section against the foot portion of the kickstand.

10 Claims, 2 Drawing Sheets

BICYCLE STAND DEVICE

BACKGROUND OF THE INVENTION

1. Field of the Invention

The present invention relates to bicycle kick stands, and more particularly to an auxiliary pad for attachment to the foot portion of a bicycle kickstand.

2. Description of the Prior Art

A common type of stand for a bicycle is the kickstand. The kickstand generally has a narrow rod projecting downward from the bicycle frame and having a portion bent to be parallel with the ground. The kickstand is generally movable from a raised position for use of the bicycle to a downwardly extending position to support the bicycle when not in use. When the bicycle is used on a concrete or asphalt surface or hard ground, the foot rod is sufficient to support the bicycle. However, in sandy and soft soil areas, the kickstand support will sink into the ground causing the bicycle to fall.

It has been known in the art to attach an auxiliary base or pad to the stand to provide a larger support base. For example, in U.S. Pat. No. 4,474,387 to Maranell et al, a rigid plate in the general form of a rectangle is attached to the foot of a kickstand by a strap.

Huth, in U.S. Pat. No. 4,521,031, teaches a simple rectangular pad having a opening and slit in one corner which is carried on the bicycle by hooking to a cable or the like and is manually placed under the kickstand foot when used. Other approaches to the problem are shown in U.S. Pat. Nos. 2,835,508 to Wood et al; 3,955,829 to Bussler; and 3,970,330 to Norcross. Although the devices taught by the prior art may generally be helpful in solving the problem, the designs are such that significant additional weight or inconvenience is added. In some units, the cost to manufacture prevents marketing at a low price.

Therefore, there is a need for a low cost device for increasing the surface area of a bicycle kickstand foot rod which will fit a number of kickstands by varying size rods and which can be manufactured and sold at a low price.

SUMMARY OF THE INVENTION

The present invention is a pad device for adding to the foot rod of a bicycle kickstand to provide a broad, non-slip surface permitting the stand to be used in sand or other soft ground. The device is preferably molded from plastic such as polypropylene. A pad piece, which may molded in a stylized shape of a human foot for appearance, is provided with a plurality of ribs on the underside, and a pair of horizontal slots on the upper side formed by a pair of molded brackets.

A second element of the invention is a clamp device molded from plastic which is connected to the pad piece. The clamp device, as produced from the mold, includes a pair of parallel semi-circular clamp elements joined by a web. Parallel with the semi-circular elements and in the web between the elements, a notch for folding is provided. A flange is attached to the outer edges of each clamp element. When the clamp element is folded along the folding notch, the two semi-circular clamp sections mate together to form a cylindrical channel. As will be described below, the clamp device is to be folded around the downwardly extending shank of a kickstand. The flanges include screw holes in mating portions which are bolted together to clamp the clamp element around the kickstand rod. From one end of each of the semi-circular channels, a first clamp leg portion extends at a slight angle. Each clamp leg portion includes a tab at the distal end having a transverse notch for folding provided and a set of small cleats projecting from the surface thereof. The tab ends of the clamp leg sections are bent outward at 90° and inserted through the slots of the pad section with the cleats serving to lock the legs into place. The position of the clamp section on the descending rod of the kickstand is adjusted so that the foot rod portion of the kickstand rests on the surface of the pad section.

Advantageously, a pair of shim sections are molded concurrently with molding of the clamp section. The shim sections are semi-cylindrical and have an outside diameter equal to the inside diameter of the clamp sections. The two shim sections are attached to the two clamp sections at the opposite ends from the clamp leg portions by a web having transverse fold notches therein. If the rod is smaller than the inner diameter of the clamp sections, the shim channels are folded over 180° to lie within the clamp sections. When the clamp screws are installed and tightened, the shim channels will permit a secure fit to be obtained. Due to the normal resiliency of polypropylene and similar plastics, a tight fit can be obtained over a range of rod diameters. Thus, the clamp is usable over a range of diameters of kickstand rods.

When the shims are not needed, they are easily broken along the fold line and discarded.

As will be recognized, the invention provides a pad for a kickstand which can be molded from plastic at low cost and which will fit kickstands having a wide range of rod diameters. Furthermore, the kickstand pad device of the invention is very lightweight and is easily and quickly installed by the average user.

It is therefore a principal object of the invention to provide an auxiliary pad for a bicycle kickstand to permit use thereof in sand or soft soil.

It is another object of the invention to provide an auxiliary pad for a bicycle foot kickstand which can be manufactured from a resilient plastic at low cost and which will add little weight to the bicycle.

It is still another object of the invention to provide a kickstand pad device having a non-skid lower surface to prevent slipping in soft soil.

These and other objects and advantages of the invention will become apparent from the following detailed description when read in conjunction with the drawings.

DETAILED DESCRIPTION OF THE PREFERRED EMBODIMENT

Figure 1:
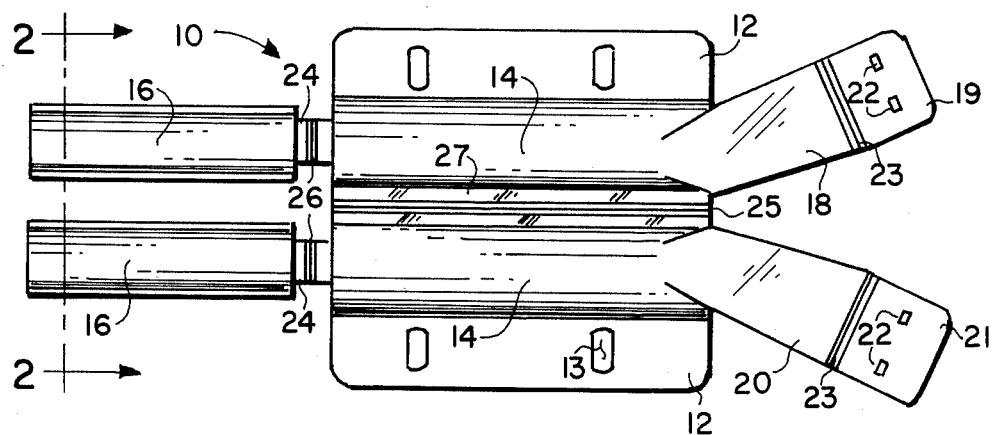
FIG. 1 is a plan view of the clamp section of the invention shown prior to assembly and installation of the invention onto a kickstand.
Figure 3:
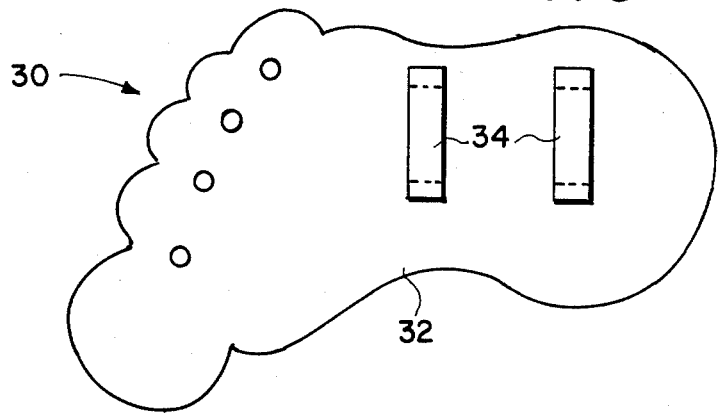
FIG. 3 is a plan view of the top surface of a pad portion of the invention showing a particular decorative design thereof.

The auxiliary pad of the invention is formed from two portions; a clamp section 10 seen in plan view in FIG. 1 before assembly of the invention and a pad section 30 shown in FIG. 3.

Clamp section 10 is preferably molded from a plastic material such as polyproplylene. The clamp section 10 includes a pair of semi-cylindrical clamp elements 14 disposed in parallel and connected by a web 27 having a fold groove 25 along a centerline thereof. A pair of clamp flanges 12 extend from the outer edges of semi-cylindrical clamp elements 14. Flanges 12 include a plurality of holes 13 for clamp screws as will be discussed hereinbelow.

As will be noted from FIG. 1, a pair of semi-cylindrical shims 16 is attached to the ends of semi-cylindrical clamp elements 14 by webs 24. Webs 24 include fold grooves 26. As best noted in FIG. 2, which is a cross-sectional view of shims 16 in the plane 2—2, shims 16 are inverted with respect to clamp elements 14. The outside radius of each shim 16 is essentially equal to the inside radius of a clamp element 14 such that a shim 16 will nest within a clamp element 14. A long clamp leg 20 extends from a second end of one of the semi-cylindrical clamp elements 14 and a short clamp leg 18 extends from the second end of the other clamp element 14. Clamp legs 18 and 20 have a base tabs 19,21 at the distal ends thereof provided with a fold groove 23 separating base tabs 19 and 21 from legs 18 and 20, respectively. Tabs 19 and 21 each have a pair of locking cleats 22 projecting therefrom.

Figure 4:
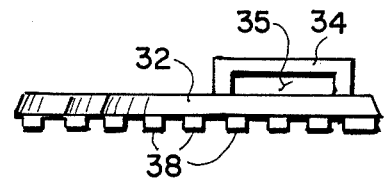
FIG. 4 is an end view of the foot portion of FIG. 3 showing a bracket and cleats.

Turning to FIGS. 3 and 4, a preferred construction of pad section 30 is shown. Pad section 30 may have any desired shape; however, a pad 32 in the form of a stylized version of a human foot is preferred for decorative purposes. Pad body 32 includes a pair of tab brackets 34, seen in side view in FIG. 4, to define a tab slot 35. A plurality of parallel cleats 38 is provided on the underside of foot plate 32 to provide traction for the device in sand and soft soil.

Figure 2:
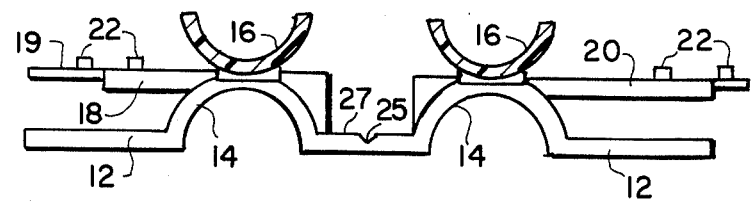
FIG. 2 is a cross-sectional view of FIG. 1 in the plane 2—2.

To assemble the clamping section 10 of the invention, flanges 12 and semi-cylindrical clamp elements 14 are folded together along fold groove 25 as indicated by the arrows A in FIG. 2. At this point, a screw and nut may be inserted through each hole 13 to temporarily hold flanges 12 together.

Figure 5:
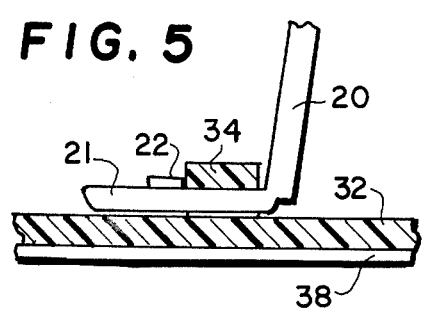
FIG. 5 is a partial cross-sectional view of the foot section of FIG. 3 showing the installation of the leg portions of the clamp section of FIG. 1.

Next, base tabs 21 and 19 are folded outward from clamp legs 18 and 20. Clamp legs 18 and 20 are then squeezed together so that base tabs 19 and 21 may be inserted through tab slots 35 in tab brackets 34. Each base tab 19 and 21 is pushed through its slot 35 so that locking cleats 22 will pass under a tab bracket 34 as shown in the cross-sectional view of FIG. 5. When both base tabs 19 and 21 are installed, clamp section 10 will be fastened to pad 32 as seen in the perspective view of FIG. 6.

At this point, the screws and nuts 11 may be removed from flanges 12 which are then spread apart sufficiently to allow the clamp elements 14 to be pushed over the vertical portion of kickstand bar 40. Screws and nuts 11, which are preferably of nylon, are installed and tightened to clamping assembly 10 to kickstand bar 40. In the event that the diameter of kickstand bar 40 is sufficiently large that a tight fit in clamp section 10 is obtained, semi-cylindrical shims 16 are cut away along fold grooves 26 and discarded. However, if a tight fit of clamping assembly 10 over kickstand bar 40 is not obtained, shims 16 may be inserted around bar 40 prior to tightening of screws and nuts 11. Due to the slight resiliency of plastics such as polypropylene, the curvature of shims 16 and clamp elements 14 will permit the clamp section 10 to conform to a range of bar diameters.

If it is noted prior to assembly of the auxiliary pad of the invention that shims 16 will be needed, the shims may be folded along fold grooves 26 to be concentric with clamp elements 14 before folding flanges 12 together.

Figure 6:
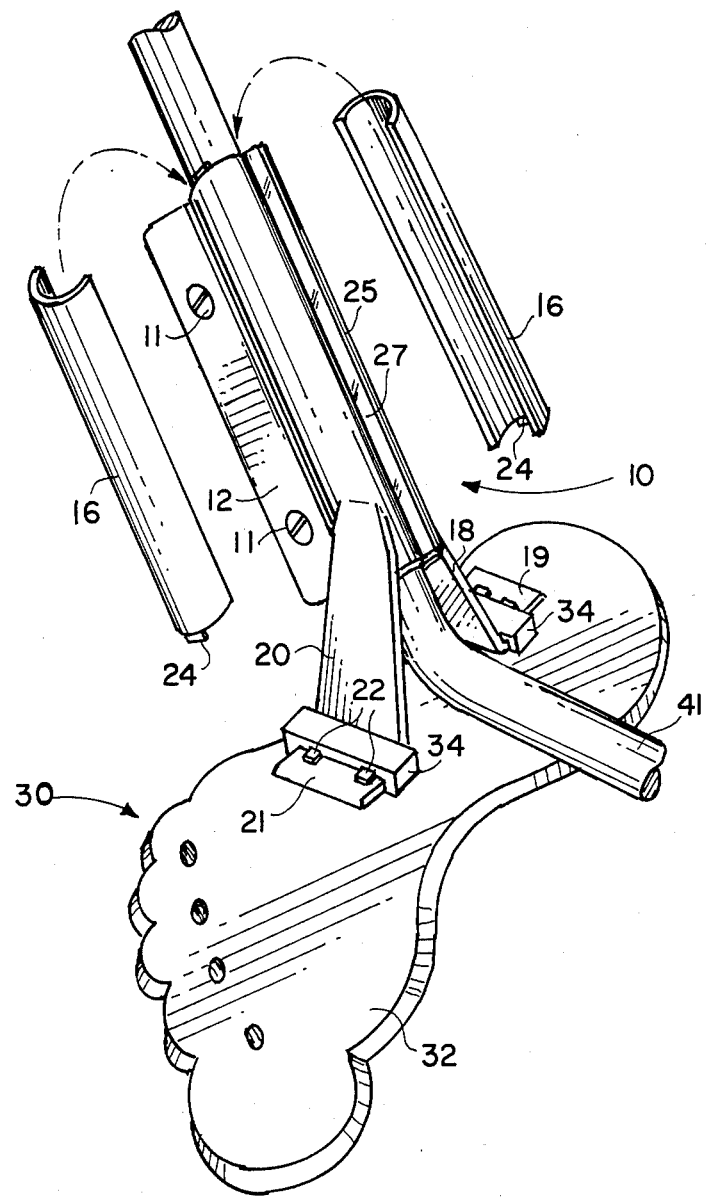
FIG. 6 shows a perspective view of the invention installed on a kickstand.

Prior to final tightening of screws and nuts 11, clamping assembly 10 is moved up kickstand bar 40 until the lower foot portion 41 thereof contacts the surface of pad 32 as shown in FIG. 6.

Having installed the invention on a kickstand as in FIG. 6, the kickstand can be kicked into the non-operative position on the bicycle by the outer end of foot portion 41 which is also used to kick the footstand to the extended position. When the bicycle is parked on soft or sandy soil, the increased area of pad 32 and the cleats 38 thereof will prevent foot portion 41 from sinking into the soil and causing the bicycle to lose its support.

As will now be recognized, the sections of the present invention may be molded at very low cost such that the unit may be sold to the public at a reasonable price. By the use of the integral shims, the unit is readily attached to kickstands having small diameter bars, yet is also usable with larger diameter bars. Through the use of a plastic such as polypropylene, the unit adds little extra weight to the bicycle and the pad 32 can be molded in a variety of attractive and decorative shapes.

Although a specific embodiment has been disclosed for exemplary purposes, it will be clear that the unit may be made with slightly different proportions and arrangements of elements without departing from the spirit and scope of the invention as defined in the claims.

I claim:

1. An auxiliary pad device for attachment to a bicycle kickstand having a downward extending rod with a lower bent portion thereof comprising:
   (a) a ground contacting essentially planar pad section having a pair of spaced apart brackets, each of said brackets defining a rectangular slot between said bracket and an upper surface of said pad element;
   (b) a clamp section for clamping to said downward extending rod, said clamp section molded from a slightly resilient plastic and having
      (i) a pair of parallel semicylindrical clamp elements connected along inner longitudinal edges thereof by a first web, said clamp elements each having a flange along an outer longitudinal edge thereof, said flanges having clamp screw holes therethrough,
      (ii) a first clamp leg attached to and extending from a first end of one of said clamp elements, said first clamp leg having a first base tab attached to a distal end thereof;
      (iii) a second clamp leg attached to and extending from a first end of the other of said clamp elements, said second clamp leg having a second base tab attached to a distal end thereof, and
      (iv) a pair of parallel semicylindrical shims attached to the second ends of said clamp elements by a pair of second webs, said shims having an outside radius essentially equal to the inside radius of said clamp elements and oriented such that folding along said second web permits said shims to be nested within said clamp elements; and (c) said clamp section is adapted to permit folding along said first web for encircling said downwardly extending rod during installation of said auxiliary pad device, and folding of said first and second base tabs with respect to said first and second clamp legs respectively to permit insertion of said base tabs through said slots of said pad section.

2. The device as recited in claim 1 in which said pad section includes a plurality of ribs disposed on the lower surface thereof.

3. The device as recited in claim 1 in which each of said base tabs include locking cleats projecting therefrom.

4. The device as recited in claim 1 in which said plastic is polypropylene.

5. The device as recited in claim 1 in which said pad section is molded of polypropylene.

6. The device as recited in claim 5 in which said pad section is in the form of a stylized version of a human foot.

7. The device as recited in claim 1 in which said flanges are held together by clamp screws.

8. An auxiliary pad device for attachment to the downward extending rod of a kickstand for a bicycle comprising:
    clamp means molded from a resilient plastic and having a pair of semicylindrical clamping elements disposed around said rod and secured thereto;
    a pair of clamp legs attached to and extending downward from said clamping elements, each distal end of said clamp legs having a base tab attached thereto, said base tab including a raised locking cleat at a distal end thereof;
    a planar pad section having a spaced apart pair of tab brackets molded on an upper side thereof, each of said tab brackets defining slots into which one of said base tabs is inserted such that said locking cleat engages said bracket to lock said pad section to said clamp legs.

9. The device as recited in claim 8 in which said clamp means and said pad section are molded from polypropylene.

10. The device as recited in claim 9 in which said pad section includes a plurality of ribs molded into an underside thereof for preventing slipping of said pad section.

* * * * *